US009016565B2

(12) United States Patent
Zhou et al.

(10) Patent No.: US 9,016,565 B2
(45) Date of Patent: Apr. 28, 2015

(54) WEARABLE PERSONAL DIGITAL DEVICE FOR FACILITATING MOBILE DEVICE PAYMENTS AND PERSONAL USE

(71) Applicants: Dylan T X Zhou, San Gabriel, CA (US); Tiger T G Zhou, Tiburon, CA (US); Andrew H B Zhou, Tiburon, CA (US)

(72) Inventors: Dylan T X Zhou, San Gabriel, CA (US); Tiger T G Zhou, Tiburon, CA (US); Andrew H B Zhou, Tiburon, CA (US)

( * ) Notice: Subject to any disclaimer, the term of this patent is extended or adjusted under 35 U.S.C. 154(b) by 222 days.

(21) Appl. No.: 13/760,214

(22) Filed: Feb. 6, 2013

(65) Prior Publication Data

US 2013/0146659 A1 Jun. 13, 2013

Related U.S. Application Data

(63) Continuation-in-part of application No. 13/185,491, filed on Jul. 18, 2011.

(51) Int. Cl.

| | |
|---|---|
| *G06K 5/00* | (2006.01) |
| *G06K 7/00* | (2006.01) |
| *G06K 7/10* | (2006.01) |
| *A61B 5/02* | (2006.01) |
| *A61B 5/00* | (2006.01) |
| *A61B 5/08* | (2006.01) |
| *G06Q 20/34* | (2012.01) |
| *G06Q 20/32* | (2012.01) |
| *G06F 1/16* | (2006.01) |
| *G06Q 20/40* | (2012.01) |

(52) U.S. Cl.
CPC .......... *G06Q 20/355* (2013.01); *G06K 7/10891* (2013.01); *G06Q 20/3274* (2013.01); *G06F 1/163* (2013.01); *G06Q 20/40145* (2013.01)

(58) Field of Classification Search
CPC . G06K 7/10722; G06K 7/14; G06K 7/10851; G06K 7/10881; G06K 7/10732; G06K 7/10891; G06Q 20/322; G06Q 20/202; G06Q 20/20; G06Q 30/06; G06Q 30/02; G07G 1/14; A61B 5/024; A61B 5/02438
USPC .............. 235/462.43, 462.44, 380, 435; 455/556.1; 600/502, 503, 30, 534; 368/11, 12

See application file for complete search history.

(56) References Cited

U.S. PATENT DOCUMENTS

| | | | | |
|---|---|---|---|---|
| 3,921,049 | A | * | 11/1975 | Mellors et al. ................. 320/101 |
| 4,403,869 | A | * | 9/1983 | Crutcher ......................... 368/10 |
| 5,241,161 | A | * | 8/1993 | Zuta .............................. 235/382 |

(Continued)

FOREIGN PATENT DOCUMENTS

JP 2008172882 A * 7/2008

*Primary Examiner* — Daniel Walsh
(74) *Attorney, Agent, or Firm* — Patent Jurist; Georgiy L. Khayet

(57) ABSTRACT

Provided is a device and methods for facilitating mobile device payments using a wearable personal digital device. The device may comprise a processor, a memory unit, a timepiece module, a communication circuit, a display, a camera, control elements, a connection port, and a band adapted to secure the device on a human body or clothes. The processor may be configured to retrieve information encoded in a barcode, generate barcodes, display retrieved information and barcodes on the display. Additionally, the device may comprise a swipe card reader to make payments using the wearable personal digital device by swiping a payment card through the device. In addition to that, the device may comprise one or more sensors and one or more accelerometers to measure biometric parameters of the user, display measured parameters on the display, and store the parameters to the memory of the device.

34 Claims, 6 Drawing Sheets

(56) References Cited

U.S. PATENT DOCUMENTS

| | | | |
|---|---|---|---|
| 5,416,730 A * | 5/1995 | Lookofsky | 361/679.09 |
| 5,650,945 A * | 7/1997 | Kita | 702/1 |
| 5,898,161 A * | 4/1999 | DeVita et al. | 235/462.44 |
| 6,158,884 A * | 12/2000 | Lebby et al. | 368/282 |
| 6,477,117 B1 * | 11/2002 | Narayanaswami et al. | 368/251 |
| 6,619,835 B2 * | 9/2003 | Kita | 368/281 |
| 6,854,652 B2 * | 2/2005 | Omori | 235/462.01 |
| 7,072,675 B1 * | 7/2006 | Kanakubo | 455/462 |
| 7,123,740 B2 * | 10/2006 | McKinley | 382/100 |
| 7,398,151 B1 * | 7/2008 | Burrell et al. | 701/410 |
| 7,424,110 B1 * | 9/2008 | Whiten, III | 379/454 |
| 7,676,870 B2 * | 3/2010 | Chen | 5/640 |
| 7,890,434 B2 * | 2/2011 | Narayanaswami et al. | 705/64 |
| 8,014,635 B2 * | 9/2011 | Kondo | 382/312 |
| 8,065,235 B2 * | 11/2011 | Narayanaswami et al. | 705/64 |
| 8,275,327 B2 * | 9/2012 | Yi et al. | 455/90.3 |
| 8,279,716 B1 * | 10/2012 | Gossweiler et al. | 368/10 |
| 8,292,184 B2 * | 10/2012 | Turbovich | 235/472.02 |
| 8,467,270 B2 * | 6/2013 | Gossweiler et al. | 368/10 |
| 8,725,842 B1 * | 5/2014 | Al-Nasser | 709/219 |
| 8,844,811 B1 * | 9/2014 | Rogers et al. | 235/382 |
| 8,851,372 B2 * | 10/2014 | Zhou et al. | 235/380 |
| 8,880,119 B1 * | 11/2014 | Naghdi | 455/556.1 |
| 2001/0017663 A1 * | 8/2001 | Yamaguchi et al. | 348/373 |
| 2002/0012292 A1 * | 1/2002 | Mitamura | 368/281 |
| 2002/0017567 A1 * | 2/2002 | Connolly et al. | 235/472.02 |
| 2002/0040316 A1 * | 4/2002 | Shin et al. | 705/10 |
| 2002/0168961 A1 * | 11/2002 | Ohba | 455/410 |
| 2002/0170961 A1 * | 11/2002 | Dickson et al. | 235/383 |
| 2003/0208110 A1 | 11/2003 | Mault et al. | |
| 2004/0020988 A1 * | 2/2004 | Omori | 235/462.01 |
| 2004/0056088 A1 | 3/2004 | Mullins et al. | |
| 2004/0087878 A1 * | 5/2004 | Krausman et al. | 600/587 |
| 2004/0140898 A1 * | 7/2004 | Reeves | 340/573.1 |
| 2004/0225613 A1 * | 11/2004 | Narayanaswami et al. | 705/64 |
| 2005/0043644 A1 * | 2/2005 | Stahmann et al. | 600/529 |
| 2005/0043772 A1 * | 2/2005 | Stahmann et al. | 607/42 |
| 2005/0065560 A1 * | 3/2005 | Lee et al. | 607/6 |
| 2005/0081847 A1 * | 4/2005 | Lee et al. | 128/200.24 |
| 2005/0177051 A1 * | 8/2005 | Almen | 600/509 |
| 2005/0265125 A1 * | 12/2005 | Yoshida et al. | 368/10 |
| 2005/0288728 A1 * | 12/2005 | Libbus et al. | 607/42 |
| 2006/0007796 A1 * | 1/2006 | Merilainen | 369/30.04 |
| 2006/0040741 A1 * | 2/2006 | Griswold et al. | 463/40 |
| 2006/0111639 A1 * | 5/2006 | Su | 600/493 |
| 2006/0170785 A1 * | 8/2006 | Mashitani et al. | 348/211.99 |
| 2006/0201964 A1 * | 9/2006 | DiPerna et al. | 222/78 |
| 2006/0238334 A1 * | 10/2006 | Mangan et al. | 340/539.13 |
| 2006/0284593 A1 * | 12/2006 | Nagy et al. | 320/109 |
| 2007/0032225 A1 * | 2/2007 | Konicek et al. | 455/417 |
| 2007/0130085 A1 * | 6/2007 | Zhu | 705/75 |
| 2007/0150006 A1 * | 6/2007 | Libbus et al. | 607/2 |
| 2007/0167851 A1 * | 7/2007 | Vitali et al. | 600/513 |
| 2008/0027337 A1 * | 1/2008 | Dugan et al. | 600/508 |
| 2008/0037375 A1 * | 2/2008 | Ellner et al. | 368/88 |
| 2008/0052236 A1 * | 2/2008 | Narayanaswami et al. | 705/44 |
| 2008/0052243 A1 * | 2/2008 | Narayanaswami et al. | 705/64 |
| 2008/0059341 A1 * | 3/2008 | Narayanaswami et al. | 705/28 |
| 2008/0210754 A1 * | 9/2008 | Lovett | 235/382 |
| 2008/0266118 A1 * | 10/2008 | Pierson et al. | 340/573.6 |
| 2008/0294019 A1 * | 11/2008 | Tran | 600/301 |
| 2008/0318636 A1 * | 12/2008 | Kim | 455/566 |
| 2009/0069045 A1 * | 3/2009 | Cheng | 455/556.1 |
| 2009/0094125 A1 * | 4/2009 | Killian et al. | 705/17 |
| 2009/0203970 A1 * | 8/2009 | Fukushima et al. | 600/301 |
| 2009/0219788 A1 * | 9/2009 | Henley, Jr. | 368/13 |
| 2009/0231960 A1 * | 9/2009 | Hutcheson | 368/10 |
| 2009/0280861 A1 * | 11/2009 | Khan | 455/556.1 |
| 2010/0112964 A1 * | 5/2010 | Yi et al. | 455/90.3 |
| 2010/0217096 A1 * | 8/2010 | Nanikashvili | 600/301 |
| 2010/0283618 A1 * | 11/2010 | Wolfe et al. | 340/575 |
| 2010/0298656 A1 * | 11/2010 | McCombie et al. | 600/301 |
| 2010/0302044 A1 * | 12/2010 | Chacon et al. | 340/575 |
| 2011/0021928 A1 * | 1/2011 | Giovangrandi et al. | 600/484 |
| 2011/0066041 A1 * | 3/2011 | Pandia et al. | 600/484 |
| 2011/0066050 A1 * | 3/2011 | Moon et al. | 600/509 |
| 2011/0105177 A1 * | 5/2011 | Batiz | 455/556.1 |
| 2011/0191252 A1 * | 8/2011 | Dai | 705/71 |
| 2011/0196732 A1 * | 8/2011 | Schueller et al. | 705/14.33 |
| 2011/0205851 A1 * | 8/2011 | Harris | 368/14 |
| 2011/0219427 A1 * | 9/2011 | Hito et al. | 726/3 |
| 2011/0245633 A1 * | 10/2011 | Goldberg et al. | 600/301 |
| 2011/0246284 A1 * | 10/2011 | Chaikin et al. | 705/14.38 |
| 2011/0248826 A1 * | 10/2011 | Criel et al. | 340/10.1 |
| 2011/0301446 A1 * | 12/2011 | Kamen | 600/365 |
| 2012/0006891 A1 * | 1/2012 | Zhou et al. | 235/380 |
| 2012/0016793 A1 * | 1/2012 | Peters et al. | 705/39 |
| 2012/0029994 A1 * | 2/2012 | Barkan et al. | 705/14.25 |
| 2012/0052910 A1 * | 3/2012 | Mu et al. | 455/558 |
| 2012/0123891 A1 * | 5/2012 | Patel | 705/26.2 |
| 2012/0205433 A1 * | 8/2012 | Dudek et al. | 235/375 |
| 2012/0215328 A1 * | 8/2012 | Schmelzer | 700/91 |
| 2012/0258692 A1 * | 10/2012 | Luk | 455/414.1 |
| 2012/0310827 A1 * | 12/2012 | Gibson, III | 705/42 |
| 2012/0310852 A1 * | 12/2012 | Ramalingamoorthy et al. | 705/323 |
| 2012/0316456 A1 * | 12/2012 | Rahman et al. | 600/547 |
| 2012/0324649 A1 * | 12/2012 | Lin | 5/613 |
| 2013/0002435 A1 * | 1/2013 | Utter, II | 340/575 |
| 2013/0043999 A1 * | 2/2013 | Van Beest | 340/573.7 |
| 2013/0048723 A1 * | 2/2013 | King | 235/383 |
| 2013/0072765 A1 * | 3/2013 | Kahn et al. | 600/301 |
| 2013/0080289 A1 * | 3/2013 | Roy et al. | 705/26.8 |
| 2013/0107674 A1 * | 5/2013 | Gossweiler et al. | 368/10 |
| 2013/0108995 A1 * | 5/2013 | DePasqua et al. | 434/236 |
| 2013/0117552 A1 * | 5/2013 | Kim | 713/100 |
| 2013/0144190 A1 * | 6/2013 | Bruce et al. | 600/586 |
| 2013/0146659 A1 * | 6/2013 | Zhou et al. | 235/380 |
| 2013/0163390 A1 * | 6/2013 | Gossweiler et al. | 368/14 |
| 2013/0168442 A1 * | 7/2013 | Little et al. | 235/375 |
| 2013/0172068 A1 * | 7/2013 | Zhou et al. | 463/16 |
| 2013/0183923 A1 * | 7/2013 | Brackett et al. | 455/404.2 |
| 2013/0218039 A1 * | 8/2013 | Sotos et al. | 600/529 |
| 2013/0238455 A1 * | 9/2013 | Laracey | 705/21 |
| 2013/0240622 A1 * | 9/2013 | Zhou et al. | 235/379 |
| 2013/0274581 A1 * | 10/2013 | Choi et al. | 600/365 |
| 2014/0006195 A1 * | 1/2014 | Wilson | 705/21 |
| 2014/0036643 A1 * | 2/2014 | Messenger et al. | 368/251 |
| 2014/0077946 A1 * | 3/2014 | Tran | 340/539.13 |
| 2014/0085077 A1 * | 3/2014 | Luna et al. | 340/539.11 |
| 2014/0107493 A1 * | 4/2014 | Yuen et al. | 600/473 |
| 2014/0125493 A1 * | 5/2014 | Utter, II | 340/870.02 |
| 2014/0135631 A1 * | 5/2014 | Brumback et al. | 600/479 |
| 2014/0143064 A1 * | 5/2014 | Tran | 705/14.66 |
| 2014/0175167 A1 * | 6/2014 | Argue et al. | 235/383 |
| 2014/0195644 A1 * | 7/2014 | Marin et al. | 709/218 |
| 2014/0232342 A1 * | 8/2014 | Turner | 320/114 |
| 2014/0239065 A1 * | 8/2014 | Zhou et al. | 235/380 |
| 2014/0249944 A1 * | 9/2014 | Hicks et al. | 705/17 |
| 2014/0266939 A1 * | 9/2014 | Baringer et al. | 343/729 |
| 2014/0278858 A1 * | 9/2014 | Sullivan et al. | 705/14.15 |
| 2014/0330408 A1 * | 11/2014 | Rolley | 700/91 |
| 2014/0330656 A1 * | 11/2014 | Zhou et al. | 705/16 |
| 2014/0343380 A1 * | 11/2014 | Carter et al. | 600/309 |
| 2015/0073232 A1 * | 3/2015 | Ahmad et al. | 600/301 |

* cited by examiner

WEARABLE PERSONAL DIGITAL DEVICE FOR FACILITATING MOBILE DEVICE PAYMENTS AND PERSONAL USE

CROSS-REFERENCE TO RELATED APPLICATIONS

This application is a continuation-in-part of U.S. patent application Ser. No. 13/185,491, entitled "FACILITATING MOBILE DEVICE PAYMENTS USING PRODUCT CODE SCANNING," filed on Jul. 18, 2011, which is incorporated herein by reference in its entirety.

FIELD

This application relates generally to payments using mobile devices in various retail environments and, more specifically, to payments using a wearable personal digital device for facilitating mobile device payments and personal use.

BACKGROUND

Mobile devices gain growing importance in daily activities of their users with more and more functions being performed by mobile devices. Some of such functions may include mobile payments using QR codes, scanning QR codes to get information, and so forth. In addition to that, most retail shops, cinemas, clubs, sports facilities, and other organizations provide discount or membership cards to their clients, issue tickets or boarding passes.

Having a certain card or paying using a mobile device may save time or grant a person some benefits, privileges, or discounts. At the same time, inconvenience related to carrying a number of cards may quickly offset any benefits or costs savings. Furthermore, carrying a mobile phone, tablet PC, or laptop may not always be comfortable. For example, during physical activity or leisure time.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is a device and methods for facilitating mobile device payments and data exchange using a wearable personal digital device. To facilitate payments, the wearable personal digital (WPD) device may have data associated with one or more payment cards or accounts of the user stored in the memory. To make a payment, the user may request the payment card or account data to be displayed on the display of the WPD device in the form of a barcode. The barcode may be then scanned by a barcode scanner, and the corresponding payment card or account may be charged. The barcode scanner may include a checkout scanner, smartphone, another WPD device, and so forth. Additionally, the WPD device may store other data, such as tickets, boarding passes, coupons, discount cards, membership cards, an identification (ID) card, a driver's license, a permanent resident card, and so forth. This data may be include a barcode and may be displayed on the display of the WPD device on a user request, thus allowing the user to present the data any time without carrying numerous cards, tickets, or passes.

Additionally, the WPD device may be used as a personal health and activity monitor. Due to a three-axis accelerometer and one or more sensors, the WPD device may track activity and energy expenditures of the user, for example, measure the number of steps walked, the quality of sleep, and other personal metrics such as blood pressure, pulse, hart rate, arterial properties, and so forth. The data associated with such measurements may be transmitted either wirelessly using Bluetooth, Wi-Fi, and so forth, or via a wire using a USB connection or the like. The data may be transmitted to various external devices, including a personal computer, a mobile device, a tablet PC, and so forth, and be processed there using a special-purpose software. In addition to that, the user may share the data via social networks or other web resources.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
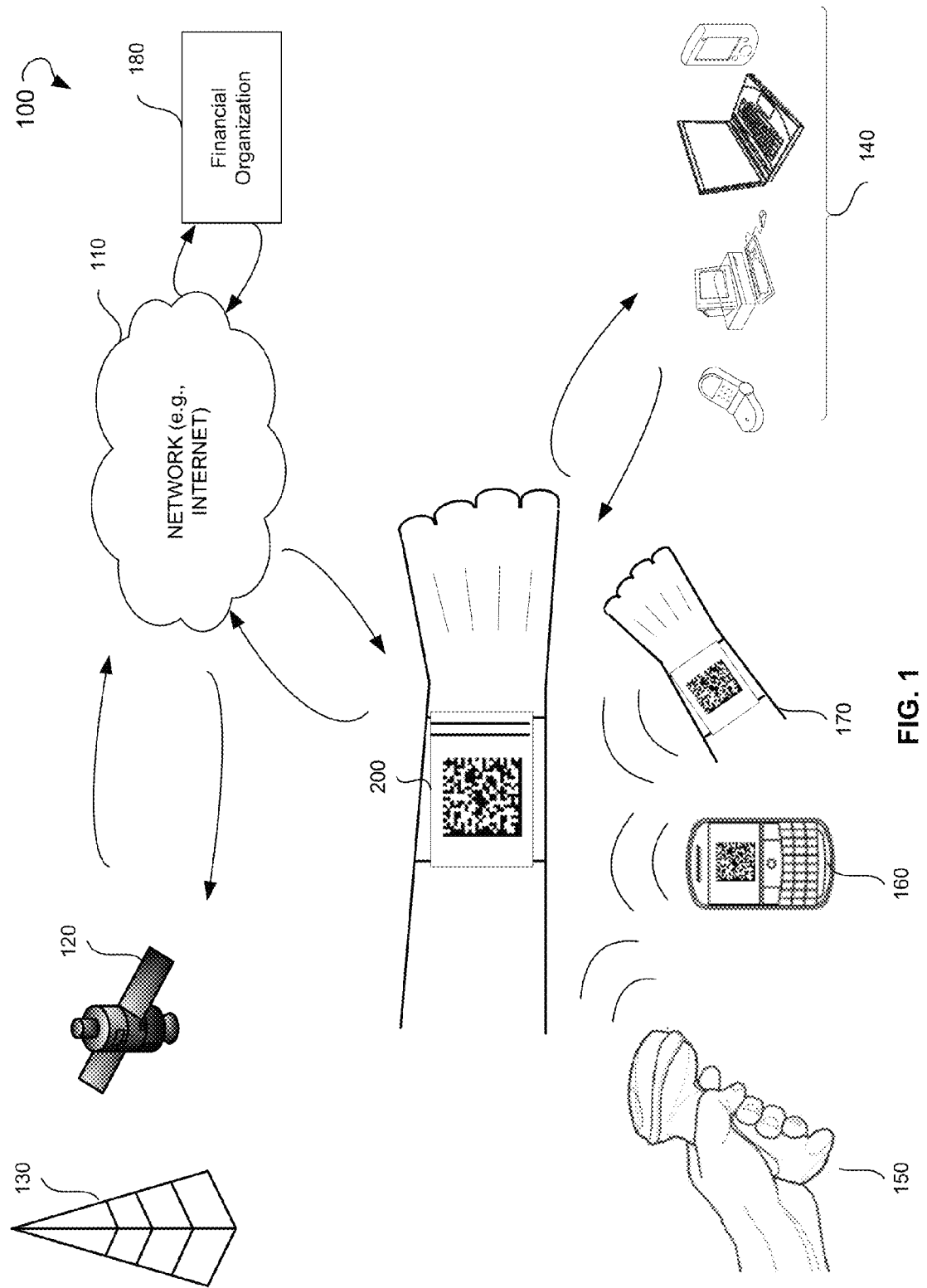
FIG. 1 illustrates an environment within which the wearable personal digital device and methods for facilitating mobile device payments using the wearable personal digital device can be implemented, in accordance to some embodiments.

A wearable personal digital device for facilitating mobile device payments and personal use and related methods are described herein. The wearable personal digital (WPD) device facilitates payments and data exchange by generating and/or displaying barcodes encoding payment information or other data on a display of the WPD device. Being worn on a wrist, the WPD device may provide for convenient carrying in many situations and environments, such as physical activity, sports, travels, leisure time, and so forth.

A user may store his payment information (i.e. payment account number, payment card, and so forth) on the WPD device. For a mobile payment, the user may request to provide the payment information. The payment information may then be encoded in a barcode and displayed on the display of the WPD device for scanning by a barcode reader, a smartphone, another WPD device, and so forth. The barcode may include various types of optical codes, such as a Unified Product Code (UPC) represented as a barcode and/or an alphanumeric string, an Electronic Product Code (EPC) encoded as a printed barcode or encoded on Radio Frequency Identification (RFID) tag, or any other variations of linear barcode, two dimensional or matrix barcodes, a snap tag code, a QR code, alphanumeric string (e.g., 8-bit, 16-bit, 32-bit string), electronically encoded codes (e.g., 96-bit strings), and so forth.

Another possible use of the WPD device may be receiving information, such as discount cards, membership cards, tickets, boarding passes, an identification (ID) card, a driver's license, a permanent resident card, and so forth. The information may be presented as or related to barcodes, encoded in barcodes, and so forth. For example, the user may store a cinema ticket in the form of a barcode on the WPD device and produce the ticket by displaying it on the display of the WPD device.

The information may be received wirelessly or by wire, by capturing an image of a discount card, ticket, boarding pass, advertising materials, and so forth. Such information may be stored on the WPD device for future usage (producing a ticket or a discount card), or the information may be retrieved from a barcode to be shown on the display of the WPD device. For example, the user may scan a barcode presented on an advertising leaflet to get additional information encoded in the barcode. The barcode may be resolved by the WPD device, and the information encoded in the barcode may be shown on the display of the WPD device for the user. In some case, the information encoded in the barcode may include a link to a web-resource. Then, after resolving the barcode the WPD device may access the web-resource and display the web-resource to the user.

In addition to that, the information retrieved from a scanned barcode may be a payment request. The payment request may include payment related information, such as receiving account, bank of the receiver, and so forth. An amount to be paid may be encoded in the barcode or provided by the paying user. Thus, users of the WPD devices may make payments to a merchant by scanning a barcode that encodes a payment request and approving the payment request retrieved from the scanned barcode. Additionally, users of the WPD devices may make payments between themselves using the WPD devices, the WPD device of the payment receiver generating and displaying corresponding barcodes, and the WPD device of the payer scanning and processing the barcode.

Furthermore, the WPD device may perform a function of a health and activity monitor. The WPD device may sense biometric data associated with the user (blood pressure, pulse, heart rate, and so forth) using one or more sensors and/or receive data on user movements using a GPS module and/or one or more accelerometers. Biometric data and user movement data may be shown of the display of the WPD device, stored in the memory of the WPD device, and/or processed by the processor of the WPD device to produce historical or averaged data.

Referring now to the drawings, FIG. 1 illustrates an environment 100 within which the wearable personal digital (WPD) device 200 and methods for facilitating mobile device payments using the wearable personal digital device 200 can be implemented. The environment 100 may include a network 110, a wearable personal digital (WPD) device 200, a mobile base station 130, a GSM satellite 120, one or more external devices 140, another WPD device 170, a mobile phone 160, a barcode scanner 150, and a financial organization. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication. The WPD device 200 may communicate with the GPS satellite via the network 110 to exchange data on a geographical location of the WPD device 200. Additionally, the WPD device 200 may communicate with mobile network operators using the mobile base station 130.

As shown, the WPD device 200 may be configured to display a barcode scannable by the barcode scanner 150, mobile phone 160, a checkout scanner, a check-in scanner, or another WPD device 170. Various examples of barcodes are described above. The WPD device 200 may communicate with the network 110 to retrieve information encoded in one or more barcodes, exchange data with the financial organization 180 to process mobile payments. Additionally, the WPD device 200 may communicate with the one or more external devices 140. The one or more external devices 140 may include a mobile phone, a smartphone, a tablet PC, a lap top, a personal computer, a digital eyeglass device, another WPD device, and so forth. Communication with the one or more external devices 140 may be via the network 110 wirelessly or by wires using various connections such as a universal serial bus (USB) port, a parallel port, an infrared transceiver port, a radiofrequency transceiver port, and so forth. Such communication may be used to exchange or store data, manage data stored on the device, synchronize data. In some embodiments, the WPD device 200 may synchronize with the one or more external devices in real time to exchange data. Additionally, the user of the WPD device 200 may communicate with others using an embedded emergency button. The emergency button may be used by senior people, children, people having health problems to request for help in case of health or other troubles, give an alert or another informational signal, or to exchange information with friends, relatives, medical institutions, and so forth.

For the purposes of communication, the WPD device 200 may be compatible with one or more of the following network standards: GSM, CDMA, LTE, IMS, Universal Mobile Telecommunication System (UMTS), 4G, 5G, 6G and upper, RFID, and so forth.

Figure 2:
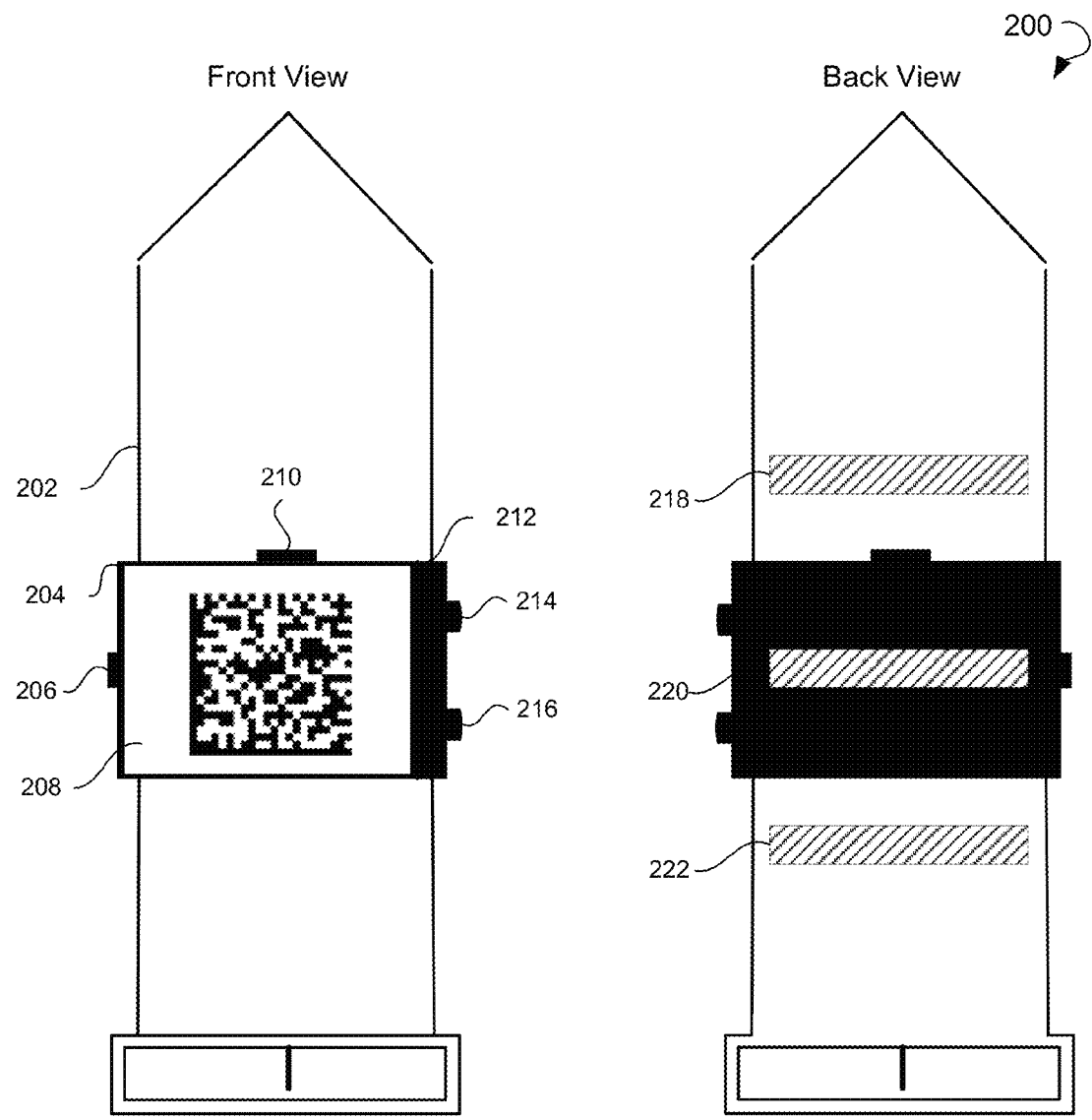
FIG. 2 illustrates an example of the wearable personal digital device, in accordance to some embodiments.

FIG. 2 illustrates an example of the WPD device 200 in accordance to some embodiments. The WPD device 200 may comprise a housing 204, which encloses a processor (not shown), a memory unit (not shown), a timepiece module (not shown), a communication circuit (not shown), a display 208, a camera 210, one or more control elements 214, 216, a swipe card reader 212, and a connection port 206, attached to a band 202. The processor may be configured to generate, based on payment data, personal data, or other data, one or more barcodes encoding the payment data, the personal data, or the other data; and provide, on a user request, one or more of the following: the one or more barcodes, the payment data, the personal data, or the other data. In some embodiments, the WPD device 200 may be further configured to download, install, and run applications, receive and send text, video, multimedia data, and perform other operations.

The memory unit may be communicatively coupled to the processor and configured to store at least the payment data, the personal data, and barcode information. The timepiece module may be communicatively coupled to the processor and configured to provide time data.

The display 208 may include a touchscreen display or any other type of display. The display 208 may be communicatively coupled to the processor and configured to graphically display one or more of the following: the payment data, the personal data, the barcode information, one or more barcodes (for example, payment barcodes), and the time data. Displaying a barcode may involve processing information to encode into a barcode image. A barcode may encode and store the payment data, the personal data, group of payment data, credit card data, debit card data, gift card data, prepaid card data, bank checking account data, digital cash data, and other data. The local processing may be performed by the processor using various software applications installed on the WPD device.

In some embodiments, the user may give a command to generate and display a barcode encoding payment data to make a payment in a retail environment. For example, the user may scan one or more product barcodes using the WPD device 200 and, based on the data retrieved from the product barcodes, cause the WPD device 200 to generate a payment barcode to purchase the products, the barcodes of which were scanned. Thus, the WPD device 200 may enable self-checkout by scanning product barcodes and generating a barcode encoding payment data of the user (a payment barcode) that may be provided for scanning by the user. The barcodes displayed by the WPD device may be scannable by a barcode scanner, a checkout scanner, a check-in scanner, an external device, another wearable personal digital device, and so forth.

In some embodiments, the display 208 may be configured to enable user interaction with the device through touch.

In a locked state, the WPD device 200 may display time provided by the timepiece module. On a request of a user, the WPD device may provide data stored in the memory unit of the device. In various examples, such data may include payment information of the user in the form of a scannable barcode, discount or membership cards of the user, tickets, coupons, boarding passes, and so forth. For receiving data, managing stored data, communicating and/or synchronizing with a cloud application, an external device, such as a PC, a laptop, a smartphone, a tablet PC, and so forth, the WPD device 200 may connect with a could application, a network, or external device using a wireless connection or by wires.

The camera 210 may be communicatively coupled to the processor and configured to scan a barcode. Scanning a barcode may involve capturing an image of the barcode using the camera 210. The scanned barcode may be processed by the processor to retrieve the barcode information. Using the camera of the WPD device, the user may capture pictures of various cards, tickets, or coupons. Such pictures, stored in the memory of the WPD device, may comprise data related to captured cards, tickets, or coupons. Additionally, the camera 210 may be configured to capture photos and record video.

In some embodiments, the camera 210 may be detachable and pluggable to a digital eyeglass device.

One having ordinary skills in the art would understand that the term "scanning" is not limited to printed barcodes having particular formats, but can be used for barcodes displayed on a screen of a PC, smartphone, laptop, another WPD device, and so forth. Additionally, barcodes by be transmitted to and from the WPD device electronically. In some embodiments, barcodes may be in the form of an Electronic Product Code (EPC) designed as a universal identifier that provides a unique identity for every physical object (not just a trade item category) anywhere in the world. It should be noted that EPCs are not exclusively used with RFID data carriers. They can be constructed based on reading of optical data carriers, such as linear barcodes and two-dimensional barcodes, such as Data Matrix symbols. For purposes of this document, all optical data carriers are referred to herein as "barcodes."

As stated, the WPD device 200 may have wireless communication capabilities enabled using at least the communication circuit. The communication circuit may be communicatively coupled to the processor and configured to communicate with one or more external devices via a network wirelessly of by wires using one or more of the following: a Bluetooth module, a WiFi module, the communication port 206, including a universal serial bus (USB) port, a parallel port, an infrared transceiver port, a radiofrequency transceiver port, and so forth. The WPD device 200 may have internet connectivity using cellular networks (e.g., 3G, 4G) as well as Wi-Fi and other types of networks. Some additional examples of such networks are GSM, CDMA, LTE, IMS, Universal Mobile Telecommunication System (UMTS), RFID, 4G, 5G, 6G and upper.

The WPD device 200 may further comprise an operating system executing on the processor. The operating system may include Android, iOS, Firefox OS, and so forth.

The one or more control elements 214, 216 may include buttons, wheels, sliders, and so forth. The one or more control elements 214, 216 may be used to control operation or functions of the WPD device 200.

The band 202 may be attached to the housing to and adapted to secure the WPD device 200 on a body or clothes of the user. In various embodiments, the WPD device 200 may be secured on a wrist, an arm, a neck, a head, a leg, a waist, or any other part of the human body, or on any part of the clothes of the user. The band 202, in various embodiments, may be implemented in various materials and/or configurations. The band 202 may be an expansion bracelet, one piece band, two piece band, and so forth. In some embodiments the band 202 may include a clasp adapted to fix the band 202 in a specific position to secure the WPD device 200 around the wrist. The clasp may include various types of clasps, buckles, tongue clasps, lobster claws, toggle clasps, Velcro, and so forth.

In some embodiments, the band 202 may be adapted to be filled with air to perform blood pressure measuring and may include a pressure adjustment device.

Additionally, in some embodiments, one or more solar cells may be disposed on the outer surface of the band 202. The solar cells may be electrically connected to a battery of the WPD device 200 and may be configured to charge the battery of the WPD device 200. In other embodiments, the WPD device 200 may be configured to charge using natural movement vibrations, for example, when the user walks, is jogging, makes exercises, and so forth. In yet other embodiments, the WPD device 200 may charge wirelessly using an external wireless charger accessory.

In various embodiments, the WPD device 200 may be metal-banded, leather banded, plastic-banded, jewelry-banded, rimmed by jewelry and/or diamonds on a bezel, rimmed by jewelry and/or diamonds on an edge of the display, and so forth.

Additionally, the WPD device 200 may include the swipe card reader 212 to read payment cards data. The swipe card reader 212 may be located on either side of the WPD device 200, vertically or horizontally.

In some embodiments, the WPD device 200 may include one or more accelerometers to track activity of the user for purposes of monitoring energy expenditures or calories burned, evaluating sleep quality, calculating breaths per minute, snoring breaks, steps and/or distance walked, and so forth.

In some embodiments, the WPD device 200 may sense biometric parameters, such as blood pressure, pulse, hart rate, arterial properties of the user, the quality of sleep, using one or more sensors 218, 220, 222. The one or more sensors 218, 220, 222 may include one or more of the following: a heartbeat rate meter, a glucose level meter, a pressure sensor, body temperature meter, environment temperature meter, one lead EGO, and so forth. The biometric parameters sensed by the one or more sensors 218, 220, 222 may be shown on the display 208, stored to the memory, and/or processed by the processor to receive historical or averaged biometric data. In various embodiments, the one or more sensors 218, 220, 222 may be located in various locations such as to ensure a secure contact with the user skin or to avoid it depending on the parameter sensed by a sensor.

In some embodiments, access to the WPD device 200 may be protected by a password, a Personal Identification Number (PIN) code, biometric authorization, and so forth. Biometric authorization may be performed using one or more biometric sensors and may include fingerprint scanning, palm scanning, face scanning, retina scanning, and so forth. In some embodiments, fingerprint scanning may be performed using a fingerprint reader integrated in the WPD device 200 or detachably connected to the WPD device. The scanned fingerprint may be matched to one or more approved fingerprints stored in the memory of the WPD device 200. The access to the device may be granted if the scanned fingerprint matches one of the stored fingerprints, otherwise access may be denied.

In certain example embodiments, the WPD device 200 may sense and track position of the user to control snoring of the user by means of one or more accelerometers and/or biometric sensors.

In further embodiments, the WPD device 200 may be used to record, send, receive, and review texts, images, video, audio, photo, multimedia, and other data.

The WPD device 200 may further include a GPS module (not shown) configured to track geographical location of the device. Such information may be applied for spatial and positional awareness tracking, monitoring position of a child, a senior, or a patient. In some embodiments, the WPD device 200 may connect to one or more external devices (for example, other WPD devices) and send data on own geographical location and receive data on geographical location of the one or more external devices. Thus, users may track geographical location of each other.

Additionally, the WPD device 200 may include an alert unit (not shown) configured to alert the user about one or more events by vibration and/or sound. For example, the WPD device 200 notify the user about incoming messages and/or data, remind to take pills, alert the time when blood pressure and glucose level of the user are high, remind to make exercises, serve as an alarm clock, and so forth.

In some embodiments, the WPD device 200 may further comprise one or more subscriber identification module (SIM) cards that can be used for connectivity and other purposes. Also, the WPD device 200 may include one or more additional memory units to expand storage capacity of the device. In some embodiments, the WPD device 200 may offer options for expandable memory by including a physical interface configured to receive memory devices external to the device. In some embodiments, the physical interface may include an external miceSecureDigital (microSD) slot. Aside from microSD slot, the WPD device 200 may provide for adding an external memory device using other interfaces such as, for example, MultiMediaCard (MMC), SD, miniSD, Firewire, and others.

Moreover, a two way radio transceiver (not shown) may be included in the WPD device 200 for communication and personal emergency response as well as entertainment use.

To provide for giving an alarm signal in case of danger or when help is needed, the WPD device 200 may comprise an emergency button. The emergency button may be used by children, seniors, patients, and so forth. The alarm signal may comprise a signal sent to an external device connected with the WPD device 200, a sound signal generated by the WPD device 200, a light signal, another signal, or a combination of them.

In some example embodiments, the WPD device 200 may further comprise a microphone (not shown). The microphone may be configured to sense voice data and transmit the voice data to the processor for processing. The voice data may include a voice command, a voice memo, a voice message, and so forth. Thus, a user may give voice commands to the WPD device 200, for example, when jogging, record voice memos, send voice messages, and so forth.

In some embodiments, the WPD device 200 may be waterproof, dust-proof, and/or shock-proof.

Figure 3:
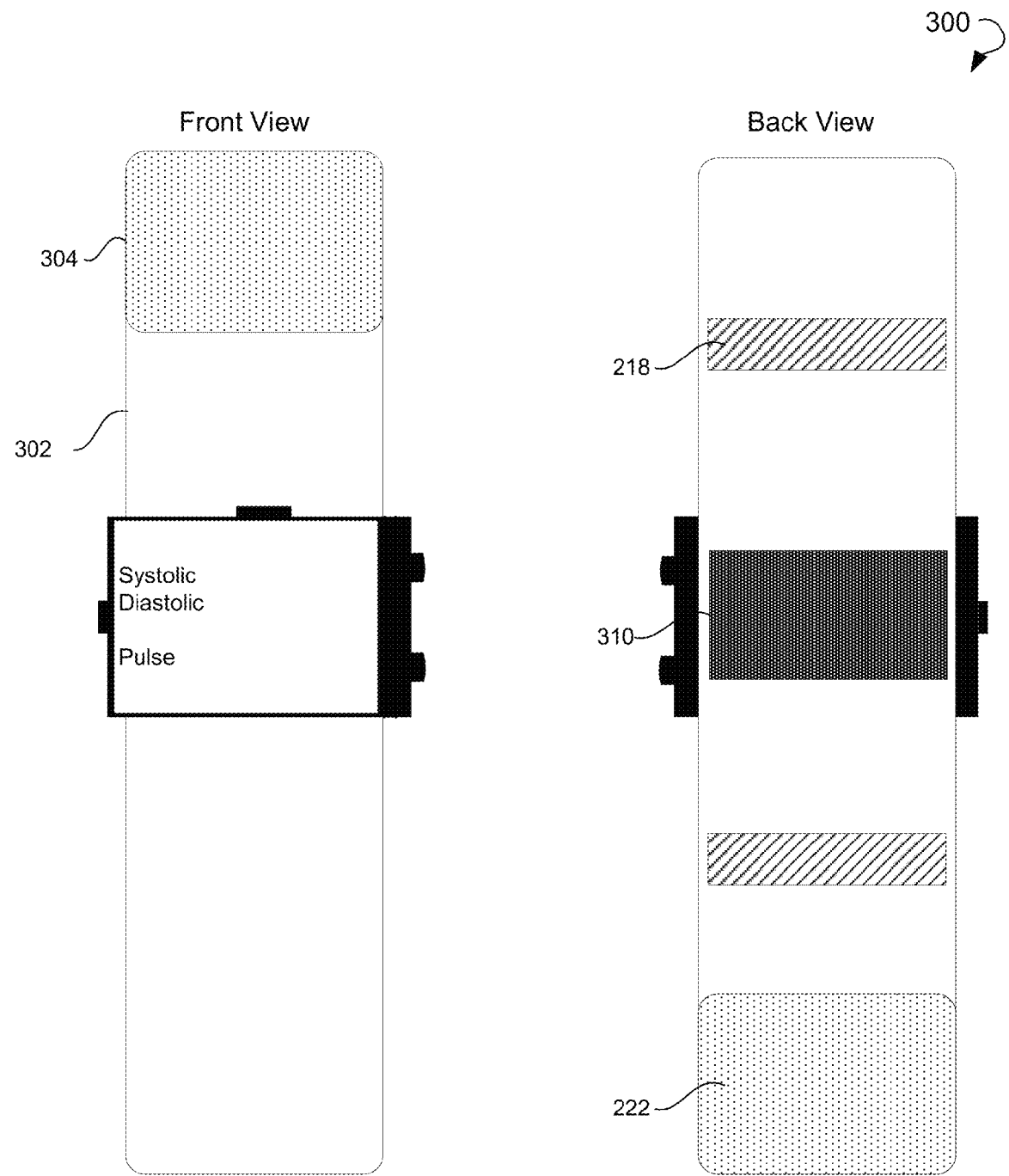
FIG. 3 illustrates an example of the wearable personal digital device adapted to monitor health and activity, in accordance to some embodiments.

FIG. 3 illustrates an example of the WPD device adapted to monitor health and activity 300, in accordance to some embodiments. The WPD device adapted to monitor health and activity 300 may include an inflatable cuff 302 serving as a band. The inflatable cuff 302 may be secured on a wrist using Velcro fastening 304, 306. To measure blood pressure the inflatable cuff 302 may be inflated/deflated using a pressure adjustment device 310. Inflation/deflation may be performed automatically, after the user gives a command to measure blood pressure. Biometric parameters may be sensed by one or more sensors 218, 222 described above. The results of the measuring may be shown on the display and/or stored to the memory of the device to track pressure changes. The biometric parameters of the user may be processed by the processor to provide data on estimated trends of some parameters, such as progress bars, graphs, charts, and so forth.

In some embodiments, the WPD device may be configured to provide good habits charts capabilities. Such charts may enable the user to set a goal (e.g. eat healthy food, make one's bed in the morning, and so forth) and view progress in its achieving by registering events that comply with the goal set. The goals set, progress and/or results may be sent to a social networking service to share and get feedback. If an event complying with the set goal is not registered, the WPD device may give an alert signal, for example, by vibration, sound, light, and so forth.

In some embodiments, data related to biometric parameters of the user may be transmitted wirelessly to one or more external devices and/or online services.

In some embodiments, the WPD device adapted to monitor health and activity 300 may be configured to continuously monitor biometric parameters of the user and produce an alarm or otherwise notify the user when one or more of the biometric parameters exceed predetermined limits.

Figure 4:
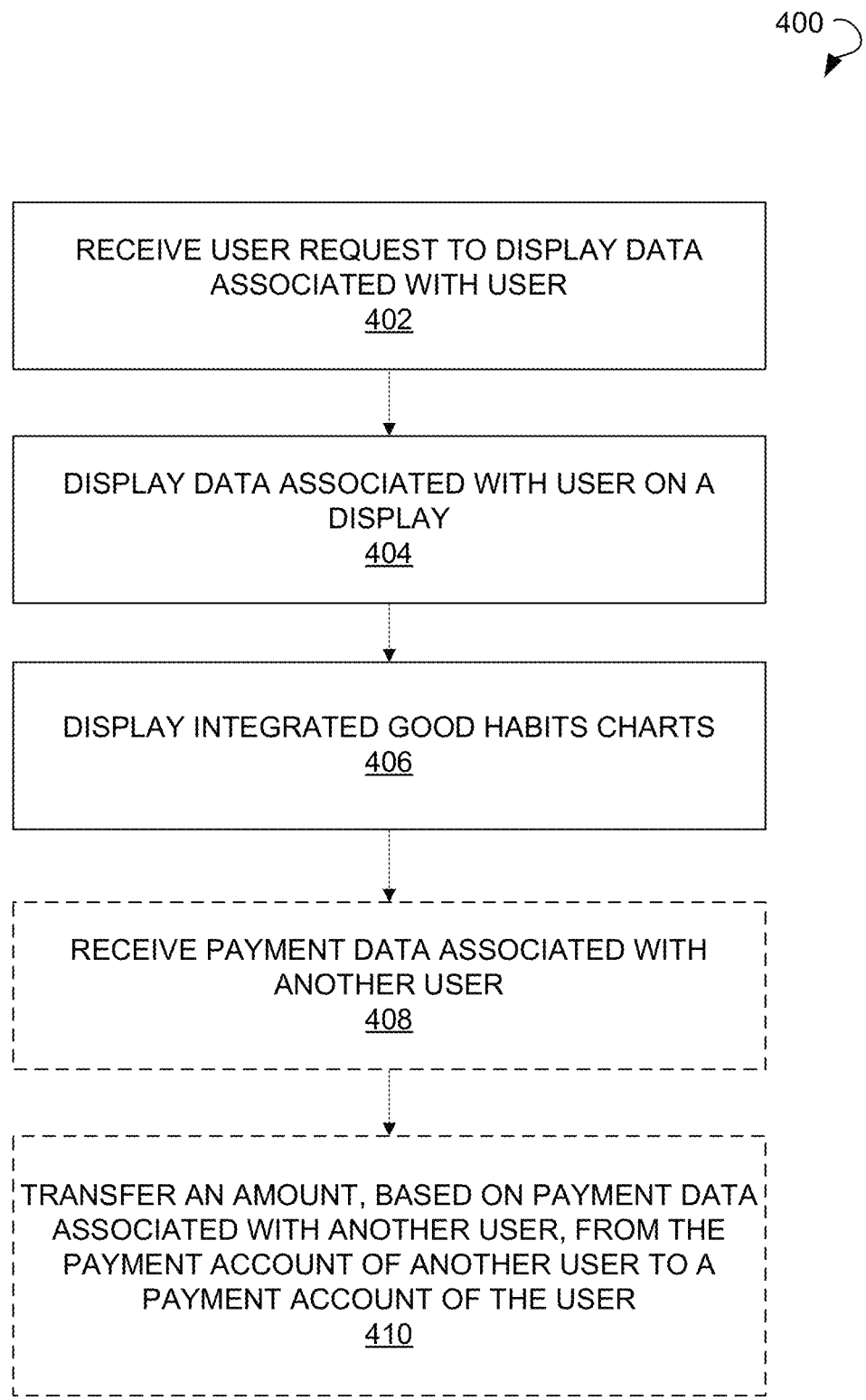
FIG. 4 is a flow chart illustrating a method for facilitating mobile device payments using a wearable personal digital device, in accordance with certain embodiments.

FIG. 4 is a flow chart illustrating a method 400 for facilitating mobile device payments using a wearable personal digital device, in accordance with certain embodiments. Method 300 may start with receiving a user request to display data associated with a user at operation 402. The data to be displayed may be stored in a memory unit of the WPD device or on a data server, in the latter case the data to be displayed may be transmitted from the data server to the WPD device. The user may send the request to display data using one or more control elements of the WPD device and/or touchscreen interface.

Based on the user request, the data associated with the user may be displayed on a display of the WPD device at operation 404. The data may be displayed in the form of a barcode scannable by a checkout scanner, check-in scanner, a mobile device, a camera, another WPD device, and so forth. The barcode may be generated by the WPD device or stored in the memory of the WPD device.

The data may include payment data, personal data, time data, or health and activity data associated with the user. The payment data may include a barcode encoding information related to a payment account of the user, payment amount, bank of the payment account, and so forth. Thus, the user may make a payment by showing a barcode encoding payment data that may be scanned, for example, by a barcode scanner instead of a payment card in a retail environment. Personal data associated with the user may include a ticket, a boarding pass, a coupon, a discount card, a membership card, and the like. The user may produce such data on a display of the WPD device to get a discount, activate a coupon, get access to a sports club, and so forth.

In some embodiments, the barcode displayed by the WPD device (e.g. QR code) may encode electronic key data to enable entry in locked premises. Such barcodes may be used to enter home rooms, office rooms, hotel rooms, and so forth. To enter a locked room, the user may provide a key barcode displayed on a display of the WPD device to be scanned by a web-camera of an access control system. The barcode scanned by the web-camera may be transmitted to the access control system to retrieve the key encoded by the barcode and find the key in a database of approved keys. If the key is found in the database, the access control system may grant the user access to the room and unlock the door. Thus, the WPD device may store electronic keys for various premises, cars, storages, and so forth allowing the user to avoid carrying a chain of keys to meet any emergence.

In some embodiments, the WPD device may be configured to display health and activity data associated with the user. On a user request, the WPD device may measure various biometric parameters of the user, display the biometric parameters on the display of the WPD device, and/or store the measured parameters in the memory. Additionally, the biometric parameters may be processed to receive summary data.

Additionally, the method 400 may include displaying integrated good habits charts on a display of the WPD device at operation 406. The good habits charts may be configured to receive, from the user, information on one or more set goals. For example, the user may set a goal to jog every morning, to smoke no cigarettes during a day, to have lunch in time, and so forth. One the goal is set, the user may provide data on events complying with the one or more set goal. In the example with the jogging, the user may mark every morning that the jogging was made. The WPD device may remind the user about the set goal. For example, the device may give an alert signal in the time specified for the set goal or give an alert signal, if the user has not marked an event complying with the one or more set goal. An alert signal may include vibration, sound, light, and/or a voice message.

Based on the events marked or not marked by the user, the WPD device may calculate user progress in achieving the one or more set goal. The user progress may be shown by various charts, tables, diagrams, graphs, and so forth. When the progress is good, the good habits charts may provide praises or compliments to the user. Moreover, the WPD device, on a user request, may transmit information related to the one or more set goal or the user progress to a social networking service to share progress and/or receive comments from user contacts in the social networking service.

Optionally, the method 400 may include receiving payment data on another user at operation 408. In some embodiments, the payment data associated with another user may be received on scanning a printed barcode or a barcode displayed on a screen of a PC, laptop, smartphone, WPD device on another user, and so forth. For example, the barcode may be scanned by capturing an image of the barcode using the camera of the WPD device. This image may be then processed by the WPD device to retrieve information encoded in the barcode. Further processing is described in more detail with reference to FIGS. 5-6.

Based on the payment data associated with another user retrieved from the barcode, at operation 410 the WPD device may give a command to transfer an amount from the payment account of another user to a payment account of the user based on the retrieved data. Information on the payment account of the user receiving the payment may be stored in the memory unit of the WPD device.

Figure 5:
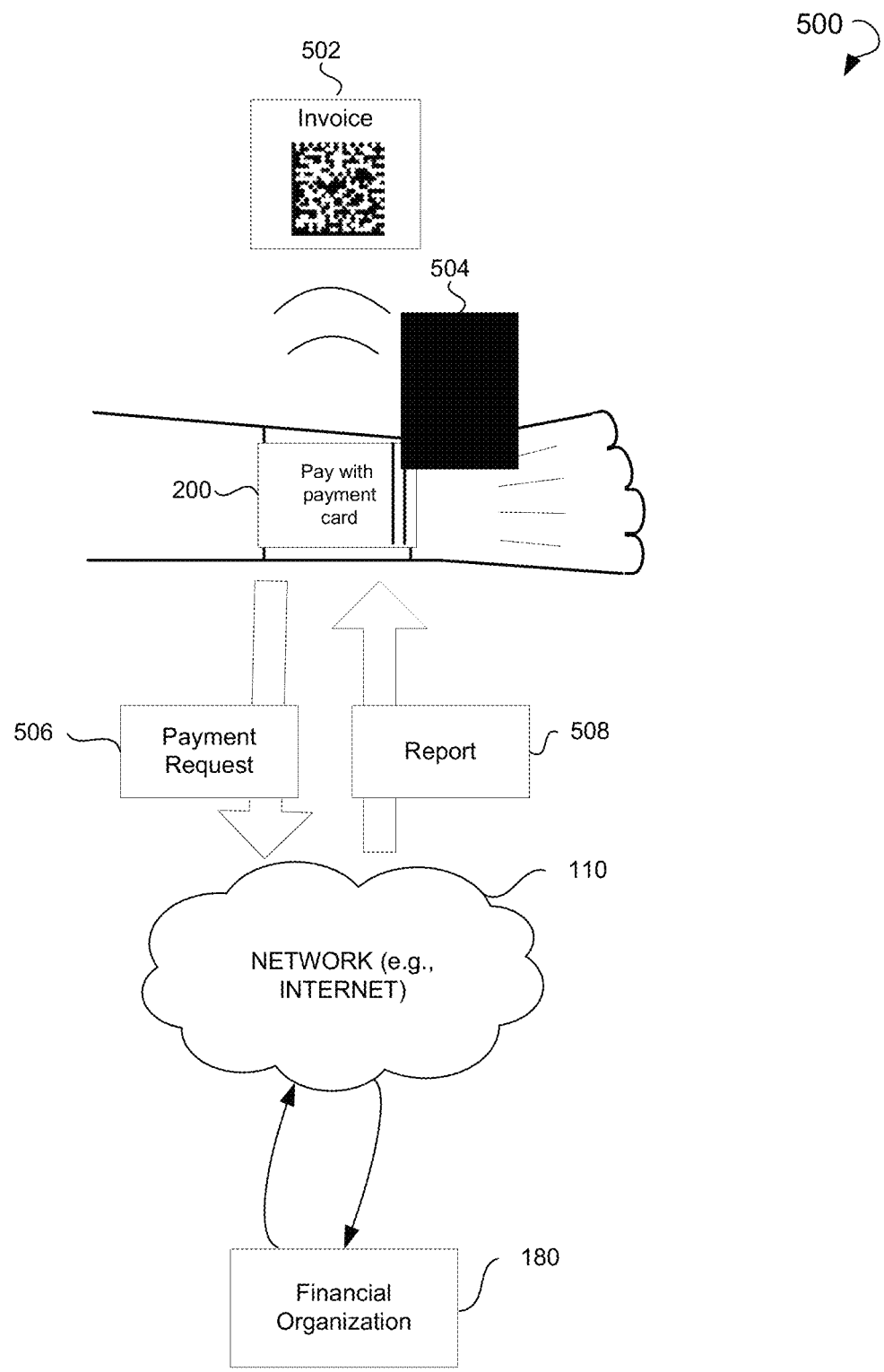
FIG. 5 shows mobile with the wearable personal digital device payment using a payment card, in accordance to some embodiments.
Figure 6:
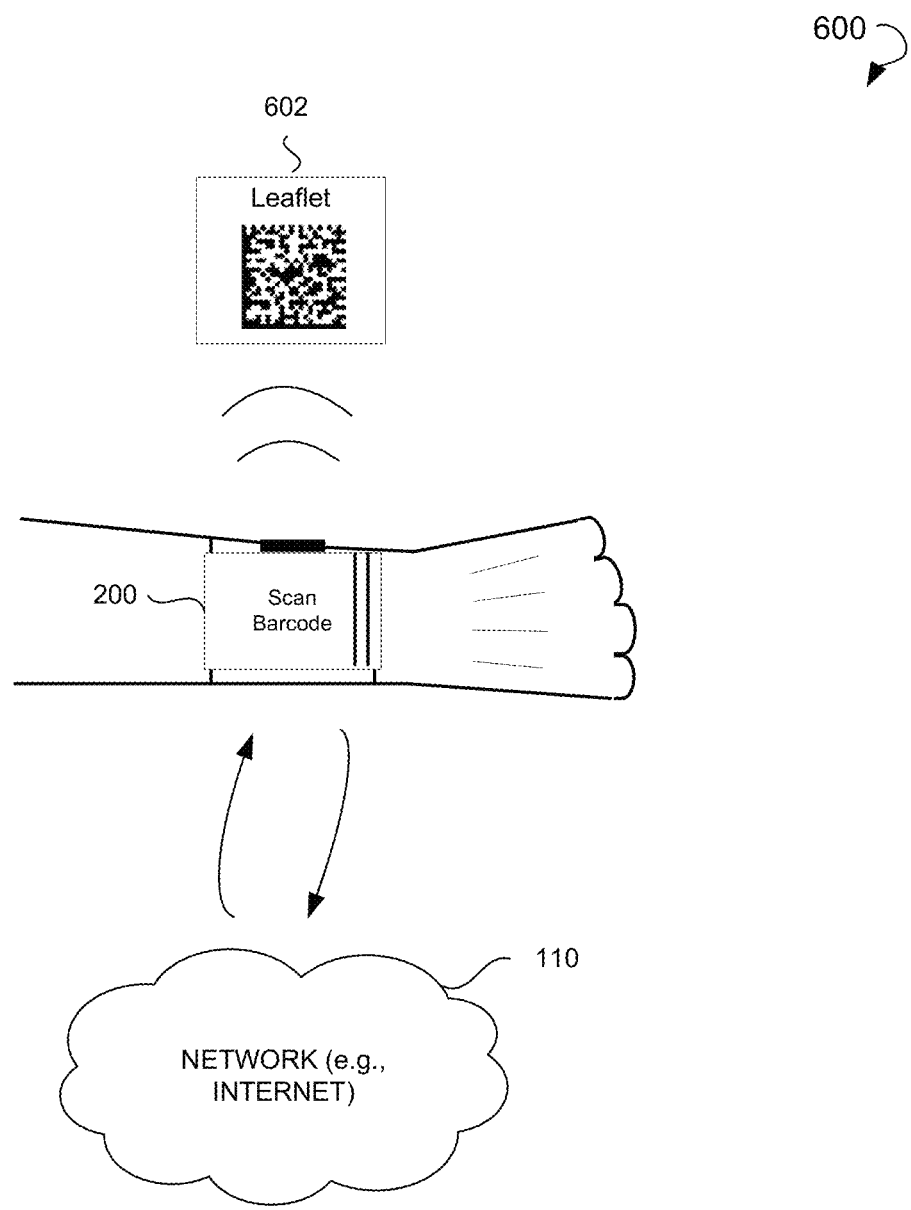
FIG. 6 shows data exchange using the wearable personal digital device, in accordance to some embodiments.

One example embodiments of method 400 will now be illustrated by FIGS. 5-6.

FIG. 5 shows payment 500 using a payment card, in accordance to some embodiments. The user may receive invoice data by scanning a barcode of an invoice 502 using a camera of the WPD device 200. The invoice 502 may encode payment request information, such as receiving account, amount to be paid, and so forth. However, in some embodiments, the amount to be paid may be provided by the user.

To pay the invoice 502, the user may choose to pay electronically using the payment data stored on the WPD device or by a payment card 504. To pay using the payment card 504, the user may swipe the payment card 504 via the swipe card reader of the WPD device. On swiping the payment card 504, the WPD receives payment data associated with the payment card 504 and generates a payment request based on the payment data associated with the payment card 504 and the payment request information of the invoice 504. Based on the payment request information and payment data associated with the user, the WPD device may send a payment request 506 to a financial organization 180 associated with the payment data associated with the payment card 504.

The payment request 506 may be then sent via the network 110 to the financial organization 180. The financial organization 180 may process the payment request 506 and either perform the payment or deny it. Then, a report 508 may be generated and sent to the WPD device via the network 110. The report may inform user whether the payment succeeded or was denied.

FIG. 6 shows data exchange 600 using the WPD device 200, in accordance to some embodiments. The user may want to obtain information encoded in a barcode presented, for example, on a leaflet 605. In such case, the user may scan the barcode on the leaflet 602 using a camera of the WPD device 200. The scanned barcode may be processed by the processor of the WPD device 200 to retrieve the encoded information, with may include a text, an URL, or other data. If the encoded information contains an URL, the WPD device 200 may communicate with the network 110 to follow the URL. In some embodiments, the user may allow or deny following the URL retrieved from the barcode.

Thus, various devices and methods for facilitating mobile payments using a wearable personal digital device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A wearable personal digital device for facilitating mobile device payments and personal use, the device comprising:
    a processor configured to:
        generate, based on payment data, personal data, or other data, one or more barcodes encoding the payment data, the personal data, or the other data;
        provide, on a user request, one or more of the following: the one or more barcodes, the payment data, the personal data, or the other data;
    a memory unit communicatively coupled to the processor and configured to store at least the payment data, the personal data, and barcode information;
    a timepiece module communicatively coupled to the processor and configured to provide time data;
    a display communicatively coupled to the processor and configured to graphically display one or more of the following: the payment data, the personal data, the barcode information, the time data, and the one or more barcodes, the one or more barcodes being scannable by a barcode scanner, a checkout scanner, a check-in scanner, an external device, another wearable personal digital device and enabling self-checkout
    a camera communicatively coupled to the processor and configured to scan a barcode, the scanning being processed by the processor to retrieve the barcode information and enable self-checkout;
    a communication circuit communicatively coupled to the processor and configured to communicate with one or more external devices; a housing adapted to enclose the processor, the memory unit, the timepiece unit, the display, the camera, and the communication circuit, wherein the housing is water-proof and dust-proof;
    a band adapted to secure the device on a human body, the human body including a wrist, an arm, a neck, a head, a leg, a waist, and any other part of the human body, or on clothes;
    biometric sensors within the band operative to sense biometric parameters of the user, the biometric parameters being stored to the memory and processed by the processor to receive historical biometric data, wherein the biometric sensors include a blood pressure sensor, a pulse sensor, a heart rate sensor, a glucose level sensor, a body temperature sensor, and an environment temperature sensor, wherein based on detection that one or more of the biometric parameters exceed predetermined limits, the wearable personal digital device for facilitating mobile device payments and personal use is configured to produce an alarm, the alarm including one or more of a sound signal, a light signal, and a vibration signal; and
    one or more accelerometers to track activity of the user, wherein the wearable personal digital device for facilitating mobile device payments and personal use is operable to break snoring based on tracking of the snoring by the one or more accelerometers.

2. The device of claim 1, wherein the display is a touch-screen display configured to enable user interaction with the device through touch.

3. The device of claim 1, wherein the communication circuit includes one or more of the following: a Bluetooth module, a WiFi module, a communication port, including a universal serial bus (USB) port, a parallel port, an infrared transceiver port, a radiofrequency transceiver port.

4. The device of claim 1, further comprising one or more control elements to control operation or functions of the wearable personal digital device.

5. The device of claim 1, wherein the measuring of the biometric sensors are shown on the display.

6. The device of claim 1, wherein access to the device is controlled by one or more of the following: a password, a Personal Identification Number (PIN) code, and biometric authorization, the biometric authorization including fingerprint scanning, palm scanning, face scanning, and retina scanning, wherein the scanning is performed using the one or more biometric sensors.

7. The device of claim 6, further comprising a fingerprint reader configured to scan a fingerprint, the scanned fingerprint being matched to one or more approved fingerprints, wherein the access to the device is granted based on the matching.

8. The device of claim 1, wherein the one or more barcodes include electronic key data, the one or more barcodes being scannable by a webcamera of an access control system and processed by the access control system, access to an item related to the access control system may be granted based on the processing.

9. The device of claim 1, wherein the barcode scanned by the camera may include a link to a web-resource, a payment request, advertising information, and other information.

10. The device of claim 1, wherein the band is adapted to be filled with air to perform blood pressure measuring and includes a pressure adjustment device.

11. The device of claim 1, wherein the band includes one or more solar cells disposed on an outer surface of the band and configured to charge the device.

12. The device of claim 1, wherein the device charges using natural movement vibrations.

13. The device of claim 1, wherein the device charges wirelessly using a wireless charger accessory.

14. The device of claim 1, the device further comprising a microphone configured to:
    sense voice data, the voice data including a voice command, a voice memo, and a voice message; and
    transmit the voice data to the processor.

15. The device of claim 1, wherein the device synchronizes with the one or more external devices in real time, tracks a geographical location of the one or more external devices in real time, and provides communication capabilities using an embedded emergency button configured to give a medical alert signal, a request for help signal, or another informational signal.

16. The device of claim 1, wherein the activity of the user includes calories burned, sleep quality, breaths per minute, snoring breaks, steps walked, and distance walked.

17. The device of claim 1, further comprising a swipe card reader to read payment cards data.

18. The device of claim 1, wherein the wearable personal digital device communicates with an external device to manage at least the payment data and the personal data.

19. The device of claim 1, wherein the device is compatible with one or more of the following network standards: GSM, CDMA, LTE, IMS, Universal Mobile Telecommunication System (UMTS), RFID, 4G, 5G, 6G and upper.

20. The device of claim 1, wherein the one or more barcodes include a linear dimensional code, a two-dimensional code, a snap tag code, and a QR code, and other machine readable code.

21. The device of claim 1, wherein the one or more barcodes encode one or more of the following: the payment data, the personal data, group of payment data, credit card data, debit card data, gift card data, prepaid card data, bank checking account data, digital cash data, and the other data.

22. The device of claim 1, further comprising an operating system executing on the processor, the operating system including Android, iOS, Firefox OS, and other operating systems.

23. The device of claim 1, wherein the processor is further configured to download applications, receive and send text, video, multimedia data.

24. The device of claim 1, the device further comprising:
a GPS module configured to track geographical location of the device;
an alert unit configured to alert the user about one or more events by one or more of the following: vibration and sound;
one or more subscriber identification module (SIM) cards;
one or more additional memory units;
a physical interface configured to receive memory devices external to the device, wherein the physical interface includes a microSecureDigital (microSD) slot;
a two-way radio transceiver for communication purposes; and
an emergency button configured to send an alarm signal.

25. The device of claim 1, wherein the camera is detachable and pluggable to a digital eyeglass device.

26. The device of claim 1, wherein the device is metal-banded, leather banded, plastic-banded, or jewelry-banded, rimmed by jewelry and diamonds on a bezel, rimmed by jewelry and diamonds on an edge of the display.

27. A method for facilitating mobile device payments using a wearable personal digital device, the wearable personal digital device comprising the wearable personal digital device of claim 1, and the method comprising:
receiving a user request to display data associated with a user, the data being stored in a memory unit of the wearable personal digital device or on a data server;
displaying the data associated with the user on a display of the wearable personal digital device; and
displaying integrated good habits charts, the good habits charts configured to:
receive one or more set goals from the user;
receive, from the user, data on events complying with the one or more set goal;
provide an alert signal based on the data on events complying with the one or more set goal, the alert signal including one or more of the following: vibration, sound, light, and a voice message;
calculate, based on the data on events complying with the one or more set goal, user progress in achieving the one or more set goal;
transmit, on a user request, information related to the one or more set goal or the user progress to a social networking service.

28. The method of claim 27, wherein the data is payment data associated with the user, the payment data being a barcode encoding a payment account information of the user, and wherein the barcode is scannable by one or more of the following: a checkout scanner, a mobile device, a camera, or another wearable personal digital device.

29. The method of claim 27, wherein the data is personal data associated with the user, the personal data being a barcode encoding one or more of the following: a ticket, a boarding pass, a coupon, a discount card, a membership card, an identification (ID) card, a driver's license, a permanent resident card, and other cards.

30. The method of claim 29, wherein the barcode is scannable by one or more of the following: a checkout scanner, a mobile device, a camera, a check-in scanner, or another wearable personal digital device.

31. The method of claim 27, further comprising:
receiving payment data associated with another user, the payment data including a payment account information of another user;
transferring an amount, based on the payment data associated with the another user, from the payment account of another user to a payment account of the user, information on the payment account of the user being stored in the memory unit of the wearable personal digital device.

32. The method of claim 31, wherein receiving the payment data associated with another user includes scanning a barcode on a screen of a device of the another user, swiping a payment card of the another user using a swipe card reader of the wearable personal digital device of the user.

33. The method of claim 31, wherein the amount is provided by the user.

34. The method of claim 31, wherein the amount is retrieved from the barcode scanned from the screen of the device of the another user.

* * * * *